United States Patent
Lee et al.

(10) Patent No.: US 11,821,248 B2
(45) Date of Patent: Nov. 21, 2023

(54) DOOR OPENER ASSEMBLY FOR PUSH TYPE FUEL DOOR

(71) Applicants: Hyundai Motor Company, Seoul (KR); Kia Motors Corporation, Seoul (KR); SAMBO A & T Co., Ltd., Chungcheongbuk-do (KR); Southco Manufacturing & Technology (Shanghai) Co., Limited., Shanghai (CN)

(72) Inventors: Seong-Muk Lee, Suwon-si (KR); Yeong-Bae Park, Hwaseong-si (KR); Joon-Ho Hong, Pyeongtaek-si (KR)

(73) Assignees: Hyundai Motor Company, Seoul (KR); Kia Motors Corporation, Seoul (KR); SAMBO A & T Co., Ltd., Chungcheonbuk-do (KR); Southco Manufacturing & Technology (Shanghai) Co., Limited., Shanghai (CN)

( * ) Notice: Subject to any disclaimer, the term of this patent is extended or adjusted under 35 U.S.C. 154(b) by 611 days.

(21) Appl. No.: 16/953,809

(22) Filed: Nov. 20, 2020

(65) Prior Publication Data
US 2021/0270073 A1   Sep. 2, 2021

(30) Foreign Application Priority Data
Feb. 28, 2020   (KR) .......... 10-2020-0025106

(51) Int. Cl.
*B60K 15/05*   (2006.01)
*E05F 11/54*   (2006.01)
(Continued)

(52) U.S. Cl.
CPC .............. *E05F 11/54* (2013.01); *B60K 15/05* (2013.01); *E05B 81/44* (2013.01); *E05B 83/34* (2013.01);
(Continued)

(58) Field of Classification Search
CPC ................................. B60K 15/05; E05F 11/54
See application file for complete search history.

(56) References Cited

U.S. PATENT DOCUMENTS 6,739,633 B2 * 5/2004 Holloway ............... E05B 83/34
292/201
9,616,745 B2 * 4/2017 Beck ....................... E05B 83/34
(Continued)

FOREIGN PATENT DOCUMENTS

KR     20100011729 A     2/2010

*Primary Examiner* — Joseph D. Pape
(74) *Attorney, Agent, or Firm* — Slater Matsil, LLP (57) ABSTRACT

A fuel door opener assembly for a push type fuel door includes a pop-up part installed inside a housing and a locking part installed inside the housing. The pop-up part includes a plunger installed to be slidable inside the housing in a state of being elastically supported, a door catch connected to the fuel door, installed to pass through the housing, disposed coaxially with the plunger, brought into contact with an end portion of the plunger, and configured to pop up the fuel door, a cam being selectively restrained by the locking part and configured to restrain sliding of the door catch when restrained by the locking part, and a plunger spring configured to elastically support the plunger toward the door catch inside the housing.

20 Claims, 12 Drawing Sheets

(51) Int. Cl.
*E05B 81/44* (2014.01)
*E05B 83/34* (2014.01)

(52) U.S. Cl.
CPC ..... *E05Y 2201/42* (2013.01); *E05Y 2201/474* (2013.01); *E05Y 2201/638* (2013.01); *E05Y 2201/722* (2013.01); *E05Y 2900/534* (2013.01)

(56) References Cited

U.S. PATENT DOCUMENTS 9,950,615 B2 * 4/2018 Horikawa ............... B60K 15/05
2010/0045049 A1 * 2/2010 Persiani ................. B60K 15/05
292/14

* cited by examiner

DOOR OPENER ASSEMBLY FOR PUSH TYPE FUEL DOOR

CROSS-REFERENCE TO RELATED APPLICATIONS

This application claims priority to Korean Patent Application No. 10-2020-0025106, filed on Feb. 28, 2020, which application is hereby incorporated herein by reference.

TECHNICAL FIELD

Exemplary embodiments of the present disclosure relate to a fuel door opener assembly for a push type fuel door.

BACKGROUND

A fuel door of a vehicle is closed to be capable of blocking an oil filling port at which a filling cap is installed and, while refueling, the fuel door is opened to be capable of opening the filling cap.

A method of opening the fuel door includes a method of opening a fuel door by operating a fuel door opening switch installed around a driver seat, and a method of opening a fuel door by pushing the fuel door without a separate switch operation. Recently, as the spread of self-service gas stations at which drivers directly refuel, application of a push type fuel door in which a locking of a fuel door is also unlocked when a driver releases a door lock is expanding.

The push type fuel door has a structure in which a catch is constantly caught to a hook provided in an inner panel of the fuel door to be locked. The structure is operated such that, when a lock of the vehicle is unlocked from the driver seat, the catch is released, and, when the fuel door is pushed, a push opener pushes a fuel door outward to open the fuel door.

However, as for a fuel door opener according to the related art, an opener and a catch are separately configured so that the number of parts is increased and weight and assembly labor are increased.

SUMMARY

The present disclosure relates to a fuel door opener assembly for a push type fuel door. Particular embodiments relate to a fuel door opener assembly that is capable of opening or closing a door through a push operation.

An embodiment of the present disclosure is directed to a fuel door opener assembly for a push type fuel door that has a simplified structure by integrating parts and is capable of unlocking and popping-up a fuel door.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a fuel door opener assembly for a push type fuel door, which includes a pop-up part installed inside a housing and configured to pop a fuel door up when the fuel door for opening or closing an oil filling port of a vehicle is pressed from the outside, and a locking part installed inside the housing and configured to release a restraint of the pop-up part to be able to pop the fuel door up or restrain the pop-up part to not be able to pop the fuel door up. In the fuel door opener assembly for pushing and popping the fuel door up, the pop-up part may include a plunger installed to be slidable inside the housing in a state of being elastically supported, a door catch connected to the fuel door, installed to pass through the housing, disposed coaxially with the plunger, brought into contact with an end portion of the plunger, and configured to pop the fuel door up, a cam selectively restrained by the locking part and configured to restrain sliding of the door catch when restrained by the locking part, and a plunger spring configured to elastically support the plunger toward the door catch inside the housing.

A portion in which the door catch is brought into contact with the plunger may include an inclined portion formed to conically protrude to one of the door catch and the plunger, and a concave portion formed in the remaining one of the door catch and the plunger and configured to accommodate the inclined portion.

An angle between a central axis of the door catch and an inclined surface of the inclined portion may be formed to be smaller than that between the central axis of the door catch and an inclined surface of the concave portion of the plunger.

A cam accommodation groove may be formed on an outer side of the door catch so as to accommodate a portion of the cam in a length direction of the door catch.

The cam may be configured such that a horizontal surface, in which a portion of a circumference of the cam is incised, and a control groove, which is formed to be concave in a V shape toward a center of the cam and restrains an end portion of the door catch according to a rotational angle of the cam, are alternately formed.

When the end portion of the door catch is caught to the control groove in a state in which a rotation of the cam is restrained, the door catch may be restrained.

The fuel door opener assembly may further include a ball slidably installed in the housing and configured to be brought into contact with an outer surface of the cam, and a ball spring configured to elastically support the ball toward the cam.

A direction in which the ball slides may be eccentric, i.e., not placed centrally, with respect to a rotating shaft of the cam.

The locking part may include a drive motor, a cam restraint gear configured to restrain or release the cam according to a rotation of the drive motor, and a power transmission member configured to transmit a driving force of the drive motor to the cam restraint gear such that the cam restraint gear restrains or releases the cam.

The cam restraint gear may include a cam restraint portion formed in a rack gear shape and inserted into a control groove formed to be concave toward a center of the cam.

A guide protrusion configured to guide sliding of the cam restraint gear may be formed in the housing, and a guide groove configured to accommodate the guide protrusion may be formed in the cam restraint gear.

The fuel door opener assembly may further include a control unit configured to be interlocked with a door lock of the vehicle and to control the locking part such that the pop-up part is in a locked or unlocked state.

DETAILED DESCRIPTION OF ILLUSTRATIVE EMBODIMENTS

Hereinafter, a fuel door opener assembly for a push type fuel door according to embodiments of the present disclosure will be described in detail with reference to the accompanying drawings.

The fuel door opener assembly for a push type fuel door according to embodiments of the present disclosure is for pushing and popping-up a fuel door D installed in a vehicle body so as to open or close an oil filling port of the vehicle. The fuel door opener assembly for a push type fuel door includes a pop-up part installed in a housing 11 and configured to pop-up the fuel door D when the fuel door D is pressed from the outside, and a locking part installed inside the housing 11 and configured to release restraint of the pop-up part so that the pop-up part pops up the fuel door D and to restrain the pop-up part from popping up the fuel door D.

The housing 11 is installed in the oil filling port of the vehicle or installed in a portion adjacent to the oil filling port.

The housing 11 has a space formed therein to accommodate components, which will be described below, in the space. Further, a through-hole is formed in the housing 11 such that a component operates by passing through the housing 11, for example, a door catch 21 is capable of being drawn out from the through-hole and inserted thereinto.

In a state in which the fuel door opener assembly is unlocked due to a body control module (BCM), when the fuel door D installed in a vehicle body is pushed, the pop-up part pops up the fuel door D with a reaction force.

To describe a configuration of the pop-up part for the above description, the pop-up part includes a plunger 22 slidably installed inside the housing 11, a door catch 21 connected to the fuel door D, installed to pass through the housing 11, disposed coaxially with the plunger 22, being in contact with an end portion of the plunger 22, and configured to pop up the fuel door D, and a cam 24 selectively restrained by the locking part and configured to restrain sliding of the door catch 21 when restrained by the locking part.

The door catch 21 is installed to pass through the housing 11. The door catch 21 is inserted into the through-hole formed in the housing 11 and slides in a sliding groove 11a formed inside the housing 11.

One end of the door catch 21, that is, an end portion located on an outer side of the housing 11, is connected to and interlocked with the fuel door D so that, when the door catch 21 moves in a direction away from the housing 11, the fuel door D is popped up. Alternatively, when the fuel door D is pushed, an operating force is transmitted to the pop-up part through the door catch 21.

A cam accommodation groove 21a is formed on an outer surface of the door catch 21 to accommodate a portion of the cam 24. The cam accommodation groove 21a is formed on the outer surface of the door catch 21 with a predetermined depth in a length direction of the door catch 21. The cam accommodation groove 21a accommodates a portion of the cam 24. Further, when the cam 24 is caught to an end portion of the cam accommodation groove 21a, the sliding of the door catch 21 is restrained.

The plunger 22 is installed coaxially with the door catch 21 inside the housing 11. The plunger 22 is also slidably installed in an axial direction of the plunger 22. Further, the plunger 22 is not mechanically connected to the door catch 21 and is installed in a state in which an end portion is brought into contact with the end portion of the plunger 22.

An inclined portion 21b and a concave portion 22a are formed in a portion in which the door catch 21 is brought into contact with the plunger 22 such that a central axis of the plunger 22 coincides with that of the door catch 21.

For example, an inner end of the door catch 21 is formed as an inclined portion 21b to conically protrude toward the plunger 22, and a concave portion 22a is formed in the plunger 22 so as to be capable of accommodating the inclined portion 21b of the door catch 21.

In particular, the inclined portion 21b of the door catch 21 is formed to have an inclination angle that is larger than that of the concave portion 22a of the plunger 22. This is to make a center of the door catch 21 coincide with that of the plunger 22. That is, the center of the inclined portion 21b is positioned as the center of the concave portion 22a so that the centers of the door catch 21 and the plunger 22 always coincide with each other.

Figure 1:
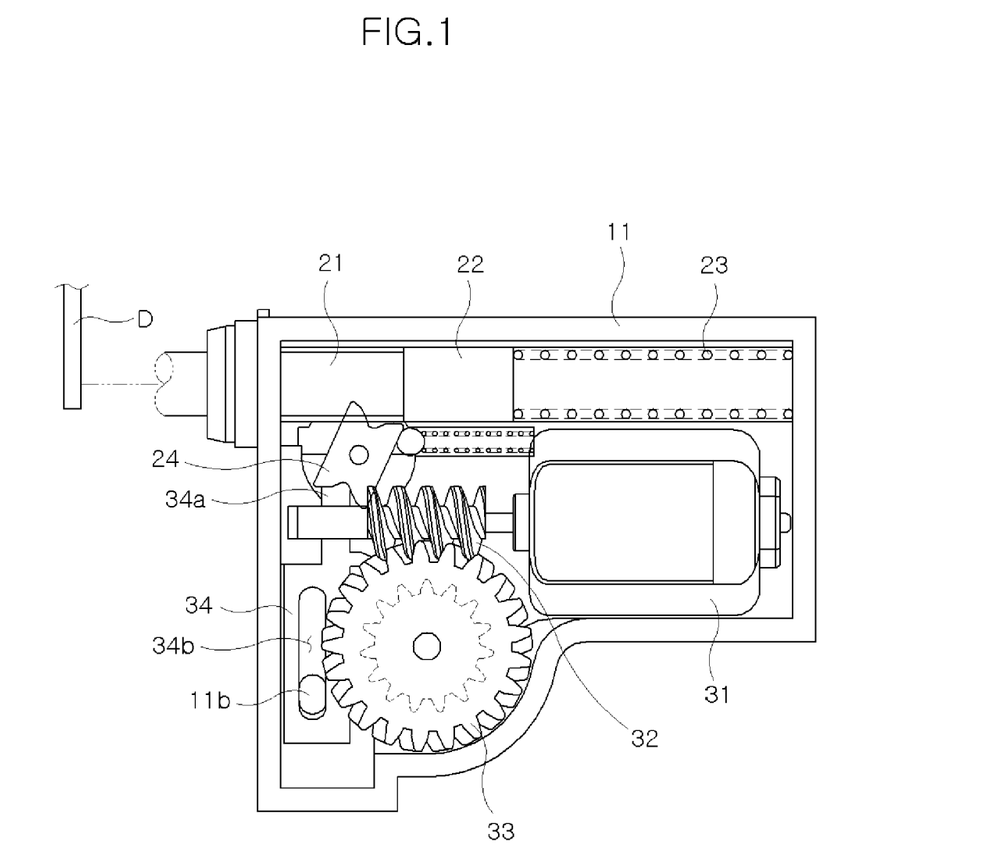
FIG. 1 is a plan view illustrating a fuel door opener assembly for a push type fuel door according to embodiments of the present disclosure.
Figure 2:
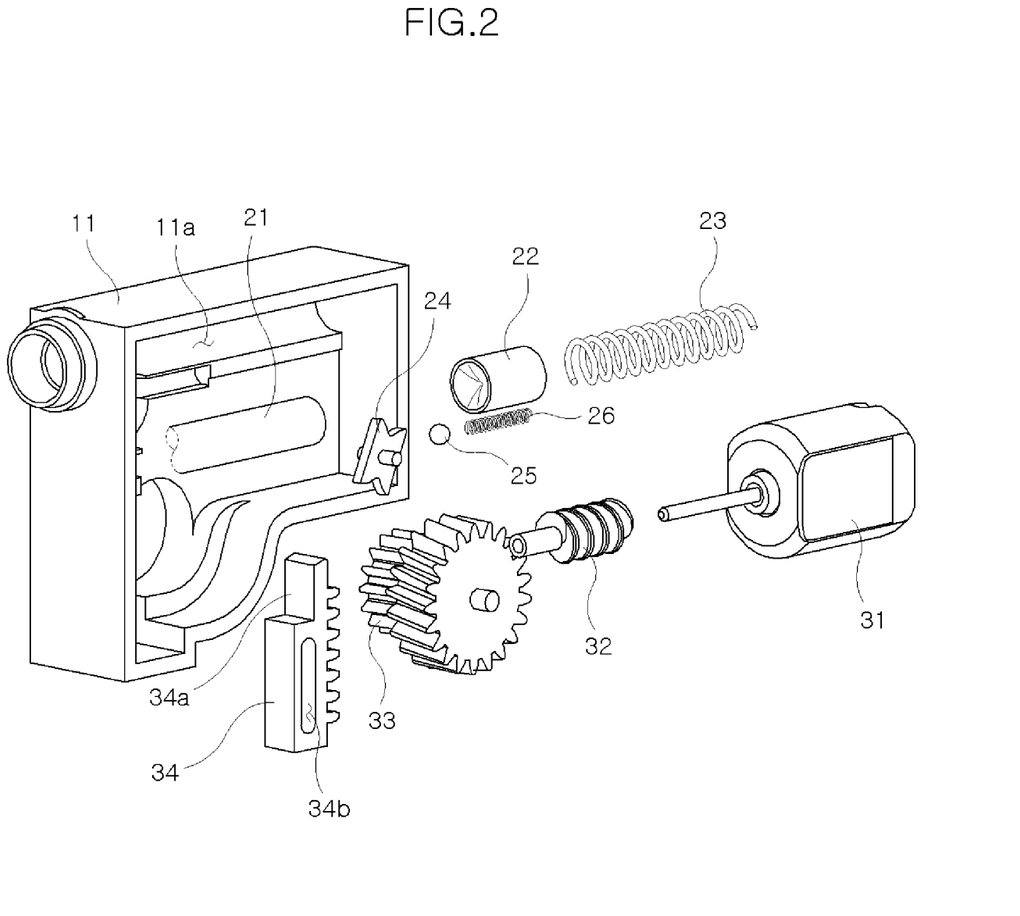
FIG. 2 is an exploded perspective view illustrating the fuel door opener assembly for a push type fuel door according to embodiments of the present disclosure.
Figure 3:
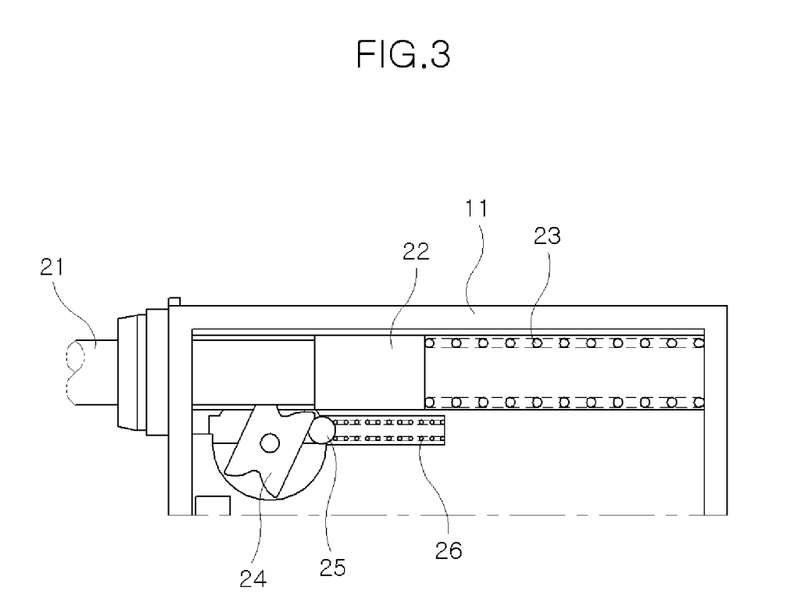
FIG. 3 is a plan view illustrating a pop-up part in the fuel door opener assembly for a push type fuel door according to embodiments of the present disclosure.
Figure 4:
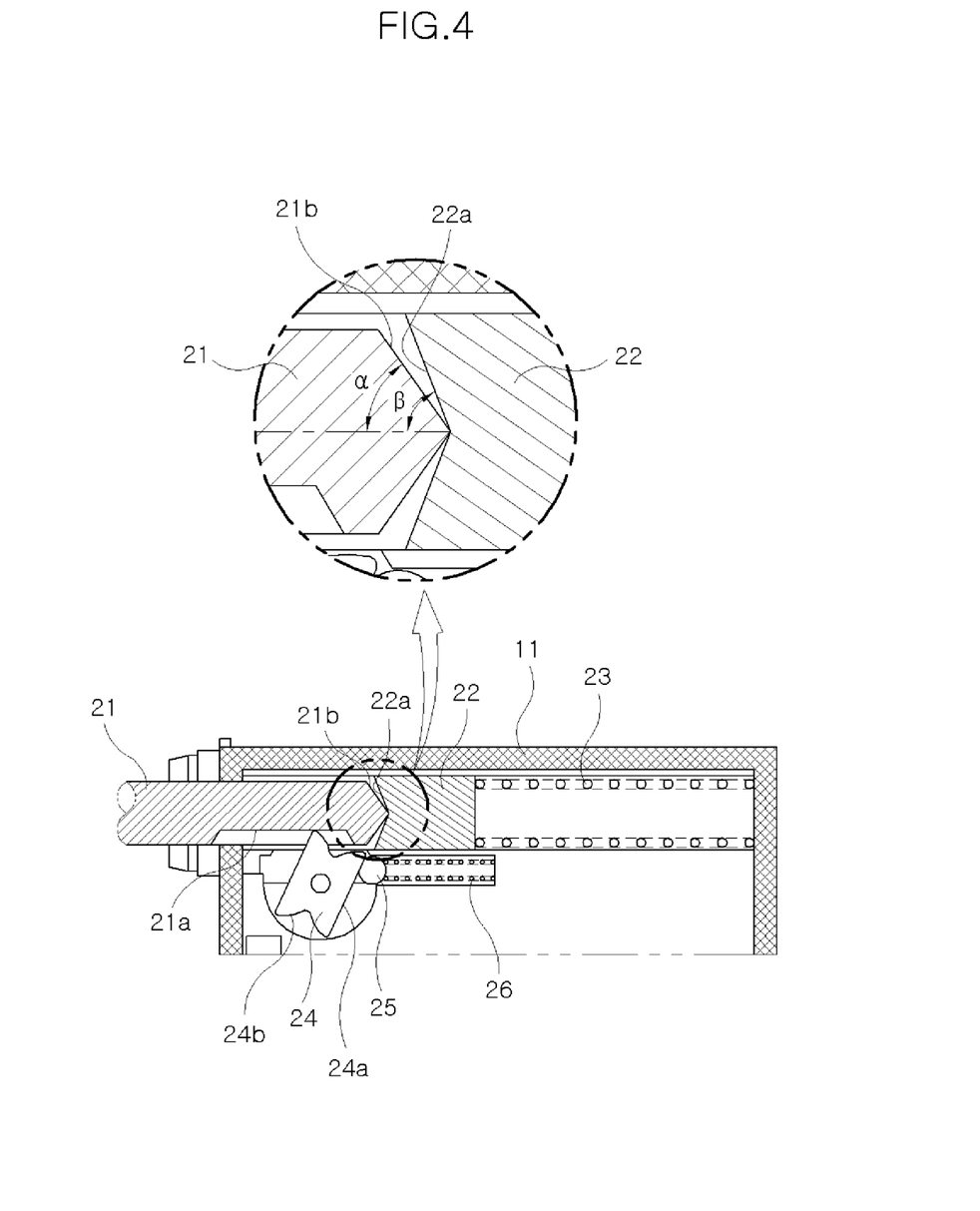
FIG. 4 is a cross-sectional view illustrating the pop-up part in the fuel door opener assembly for a push type fuel door according to embodiments of the present disclosure.

Referring to FIG. 4, an angle α between the central axis of the door catch 21 and an inclined surface of the inclined portion 21b is formed to be larger than an angle β between the central axis of the door catch 21 and an inclined surface of the concave portion 22a of the plunger 22 so that the central axes of the door catch 21 and the plunger 22 always coincide with each other.

Alternatively, a concave portion may be formed in the door catch 21 and the inclined portion 21b may be formed in the plunger 22.

The plunger 22 is installed to be elastically supported toward the door catch 21 due to a plunger spring 23 installed inside the housing 11. The plunger spring 23 elastically supports the plunger 22 toward the door catch 21 so that the door catch 21 and the plunger 22 are always in a contact state.

The cam 24 is rotatably installed inside the housing 11.

The cam 24 includes a horizontal surface 24a formed to not interfere with the sliding of the door catch 21 along a circumference of the cam 24, and a control groove 24b formed to be concave toward a center of the cam 24. The horizontal surface 24a and the control groove 24b are alternately formed along the circumference of the cam 24. For example, two horizontal surfaces 24a and two control grooves 24b are formed.

The horizontal surface 24a is formed in a shape in which a portion of a disc is incised. When the horizontal surface 24a and the door catch 21 are substantially in parallel with each other, the cam 24 and the door catch 21 do not interfere with each other so that the door catch 21 may slide without restraint.

The control groove 24b is formed to be concave in a V shape toward the center of the cam 24. The control grooves 24b are formed to be symmetrical with each other at an interval of 180 degrees based on a rotating shaft of the cam 24, and the horizontal surface 24a is formed between the control grooves 24b.

The control groove 24b restrains circumferences of an end portion of the door catch 21 and the end portion of the plunger 22 according to the rotation angle of the cam 24, or a cam restraint portion 34a of a cam restraint gear 34 is inserted into the control groove 24b to restrain a rotation of the cam 24. In a state in which the cam restraint portion 34a is inserted into the control groove 24b and restrained, when the opposite control groove 24b restrains the end portion of the door catch 21, the door catch 21 cannot slide. Alternatively, when the cam restraint portion 34a is released from the control groove 24b, the door catch 21 may slide.

The ball 25 is slidably installed inside the housing 11.

Further, the ball 25 is elastically supported to be brought into contact with an outer surface of the cam 24 inside the housing 11. Since the ball 25 is brought into contact with the outer surface of the cam 24 in a state of being elastically supported, an attitude of the cam 24 is controlled. That is, since a direction in which the ball 25 slides is eccentric with respect to the rotating shaft of the cam 24, the ball 25 elastically supports the cam 24 such that the cam 24 is rotated in one direction (a counterclockwise direction in the drawing).

The locking part puts the pop-up part in a locked or unlocked state.

The locking part includes a drive motor 31, a power transmission member for transmitting a driving force of the drive motor 31, and the cam restraint gear 34 configured to slide due to the driving force transmitted through the power transmission member to restrain the cam 24.

When the drive motor 31 receives an operating signal from a controller 41 installed in a vehicle, for example, a BCM, the drive motor 31 may rotate to restrict the pop-up part or release the restraint thereof according to a signal input from the controller 41.

The cam restraint gear 34 is slidably installed inside the housing 11.

While sliding inside the housing 11, the cam restraint gear 34 is engaged with the cam 24 to restrain the cam 24 or separated from the cam 24 to release the restraint of the cam 24. To this end, the cam restraint gear 34 is formed in a rack gear shape. Further, the cam restraint portion 34a is formed to extend from one side of the cam restraint gear 34 toward the cam 24 to be inserted into the control groove 24b of the cam 24. Since the cam restraint gear 34 is formed in a rack gear shape and thus a rotating force of the drive motor 31 is converted into a rectilinear movement, the cam restraint gear 34 may slide. Further, when the cam restraint portion 34a is inserted into the control groove 24b of the cam 24 according to a position of the cam restraint gear 34, since the cam restraint portion 34a restrains the rotation of the cam 24 to restrain the pop-up part, the fuel door D is restrained in a state of being blocked, or the cam 24 is rotatable to release the restraint of the pop-up part so that the fuel door D is openable.

When the cam restraint gear 34 slides in the housing 11, a guide structure is formed in the cam restraint gear 34 and the housing 11 so as to guide the sliding of the cam restraint gear 34. For example, a guide protrusion 11b is formed in the housing 11 and a guide groove 34b is formed in the cam restraint gear 34, thereby guiding the sliding of the cam restraint gear 34.

The power transmission member transmits the driving force of the drive motor 31 to the cam restraint gear 34. Since a rotating shaft of the drive motor 31 performs a rotational movement but the cam restraint gear 34 performs a rectilinear movement, the power transmission member converts the rotational motion into the rectilinear movement and transmits the rectilinear movement.

For example, the power transmission member may include a worm gear 32 installed on the rotating shaft of the drive motor 31, and a worm wheel 33 configured to drive the cam restraint gear 34 while being driven by being engaged with the worm gear 32. Portions of the worm wheel 33, which are engaged with the worm gear 32 and the cam restraint gear 34, may be formed in multiple stages. In the worm wheel 33, the portion engaged with the worm gear 32 may be formed in a helical gear shape to facilitate engagement with the worm gear 32, and the portion engaged with the cam restraint gear 34 may be formed in a spur gear shape.

An operation of the fuel door opener assembly for a push type fuel door having the above-described configuration according to embodiments of the present disclosure will be described below.

Figure 6:
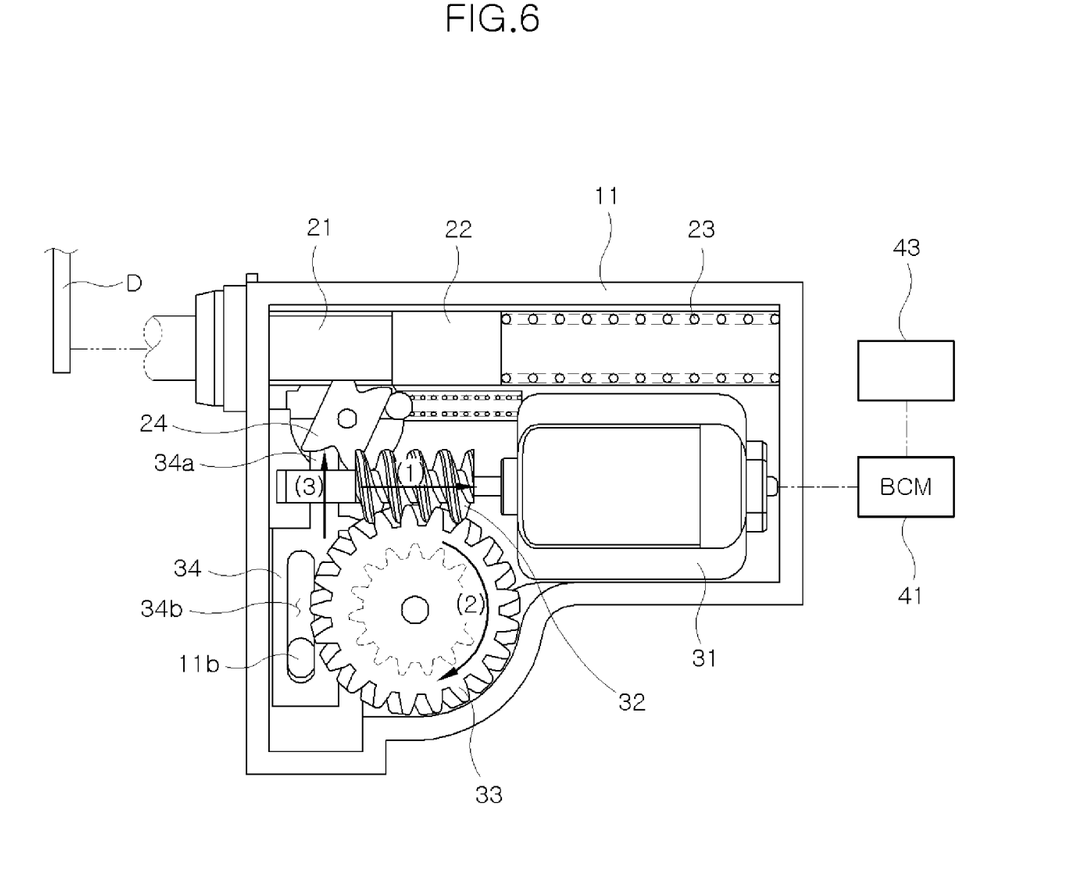
FIG. 6 is a schematic diagram illustrating a locked state of the fuel door opener assembly for a push type fuel door according to embodiments of the present disclosure.
Figure 7:
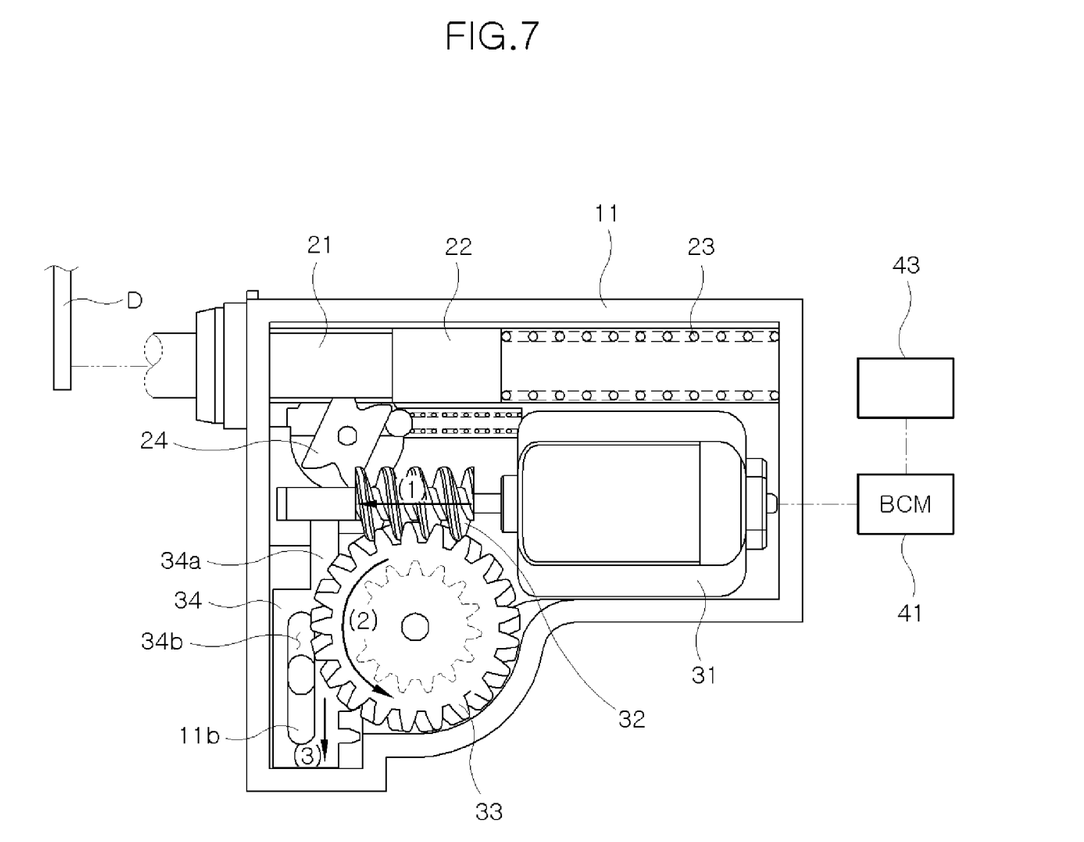
FIG. 7 is a schematic diagram illustrating an unlocked state of the fuel door opener assembly for a push type fuel door according to embodiments of the present disclosure.

Referring to FIGS. 6 and 7, a locked state (FIG. 6) and an unlocked state (FIG. 7) of the fuel door opener assembly will be described first.

When a door lock 43 of the vehicle is locked, the BCM 41 drives the drive motor 31 and thus the locking part restrains the pop-up part so that the fuel door opener assembly is locked. When a driver operates a door lock switch to a lock state so as to lock all doors of the vehicle, the driver locks all doors of the vehicle with a key after a passenger exits, or once the vehicle is driving over a predetermined speed, the BCM 41 locks all the doors of the vehicle. When the door lock 43 of the vehicle is locked, the fuel door opener assembly is also locked by being interlocked with the locking of the door lock 43.

When the BCM 41 applies a drive signal for locking the fuel door opener assembly to the drive motor 31, the drive motor 31 rotates in one direction to move the cam restraint gear 34 toward the cam 24 through the power transmission member. In FIG. 6, when the drive motor 31 is driven and thus the worm gear 32 is moved in an arrow direction (1), the worm wheel 33 is rotated in an arrow direction (2) and the cam restraint gear 34 is moved in an arrow direction (3). When the cam restraint gear 34 is moved toward the cam 24 and thus the cam restraint portion 34a is inserted into the control groove 24b of the cam 24, the rotation of the cam 24 is restrained.

When the rotation of the cam 24 is restrained, the pop-up part is restrained, and thus the fuel door opener assembly is locked.

When the door lock 43 of the vehicle is unlocked, the BCM 41 drives the drive motor 31 and thus the locking part releases the restraint of the pop-up part so that the fuel door opener assembly is unlocked. When the door lock 43 is unlocked such as when the driver operates the door lock 43 to an unlocked state or unlocks the vehicle with a key, the fuel door opener assembly is also unlocked by being interlocked with the unlocking of the door lock 43. However, even when the fuel door opener assembly is in an unlocked state, the fuel door D is not immediately opened but is in an openable state. When the fuel door D is in the openable state, the fuel door D is popped up due to an operation of the pop-up part, which will be described below, and opened.

When the BCM 41 applies a drive signal for unlocking the fuel door opener assembly to the drive motor 31, the drive motor 31 rotates in a direction opposite the direction of FIG. 6 to move the cam restraint gear 34 to be released from the cam 24 through the power transmission member. In FIG. 7, when the drive motor 31 is driven, the worm gear 32, the worm wheel 33, and the cam restraint gear 34 are operated in the arrow directions (1) to (3), the cam restraint gear 34 is released from the cam 24, and the cam restraint portion 34a is released from the control groove 24b of the cam 24 so that the cam 24 is in a rotatable state.

When the cam 24 is rotatable, the pop-up part is able to be popped up.

FIGS. 5A to 5F illustrate operation states of the pop-up part in a state in which the locking part releases the restraint of the cam 24.

Even when the locking part releases the restraint of the cam 24, the plunger 22 is engaged with the cam 24 so that the plunger 22 does not push the door catch 21. That is, in the state of FIG. 5A, the plunger 22 is able to move to a left side of the drawing (see an arrow) due to the plunger spring 23, but the cam 24 is also able to rotate in the counterclockwise direction (see arrow) due to the ball spring 26. Since the plunger 22 is engaged with the cam 24, the plunger 22 and the cam 24 are maintained in the state of FIG. 5A. Further, since the cam 24 restrains the door catch 21, the fuel door D is not popped up. In this state, the door catch 21 protrudes by as much as a predetermined displacement a.

Figure 5A:
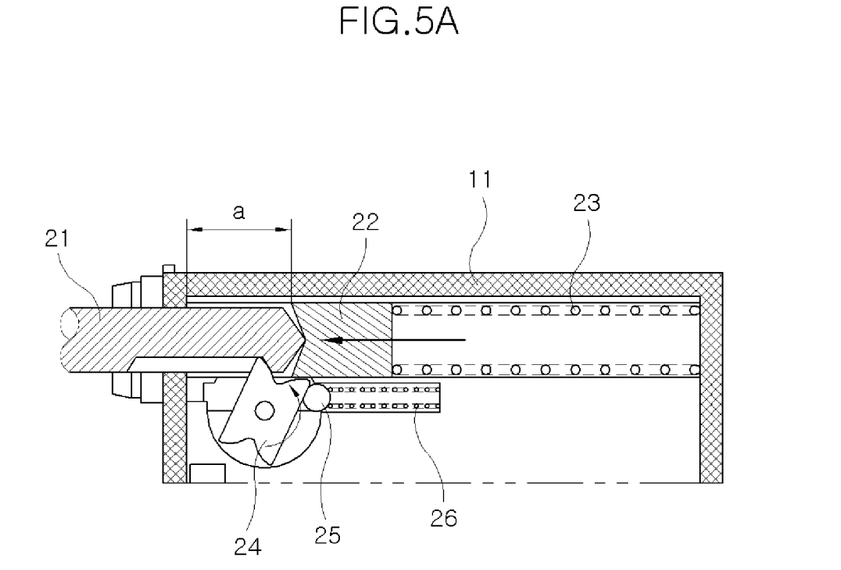
FIGS. 5A to 5F are cross-sectional views sequentially illustrating operation states of the pop-up part in the fuel door opener assembly for a push type fuel door according to embodiments of the present disclosure.
Figure 5B:
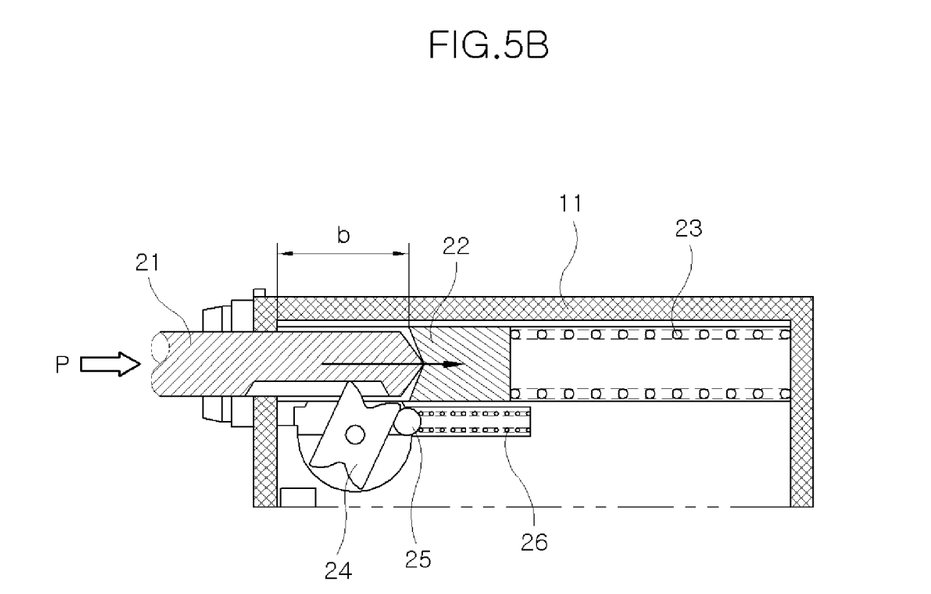
Figure 5C:
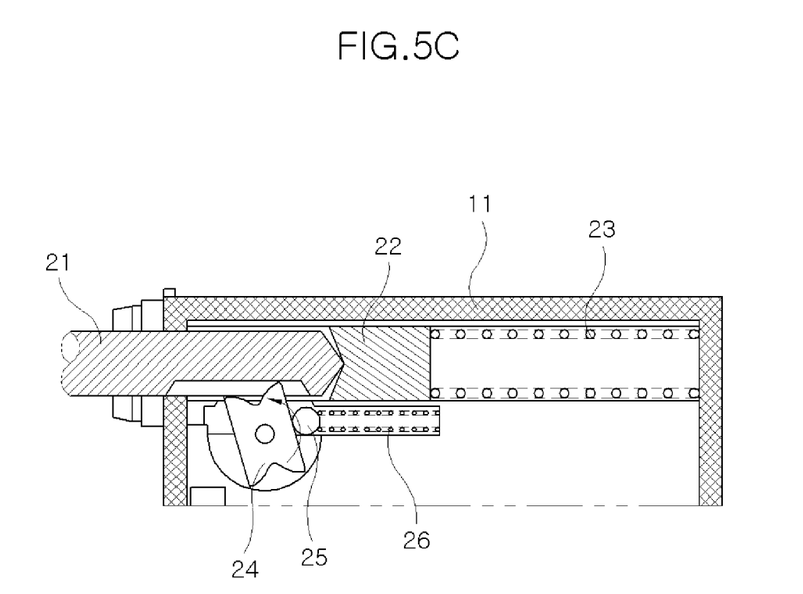
Figure 5D:
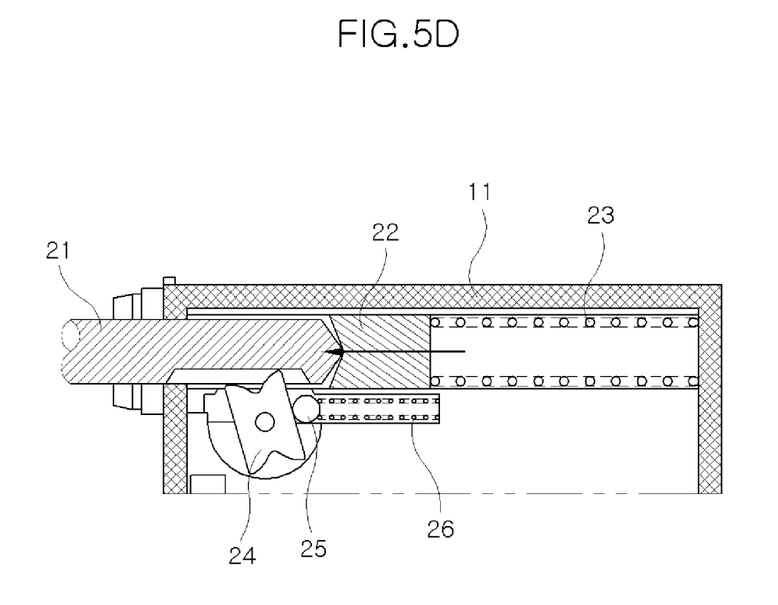

FIG. 5D illustrates a state in which the fuel door D is pushed. When the fuel door D is pushed, the door catch 21 is inserted into the housing 11. When the door catch 21 is inserted into the housing 11, the door catch 21 pushes the plunger 22 into the housing 11 such that the plunger spring 23 is maximally compressed. In this case, even when the door catch 21 is moved, the cam 24 is maintained in the state as shown in FIG. 5A due to the cam accommodation groove 21a. Since the door catch 21 is inserted in the state in which the fuel door D is pushed, the door catch 21 has a displacement b shown in FIG. 5B.

When the fuel door D continues to be pushed, the restraint between the door catch 21 and the cam 24 is released so that the cam 24 is rotated in the counterclockwise direction due to an elastic force of the ball spring 26 (see FIG. 5C).

Then, when the push of the fuel door D is released, the plunger spring 23 pushes the plunger 22 and the door catch 21 (see FIG. 5D). When the door catch 21 slides to the outside of the housing 11, the end portion of the cam accommodation groove 21a of the door catch 21 rotates the cam 24 in the counterclockwise direction.

Figure 5E:
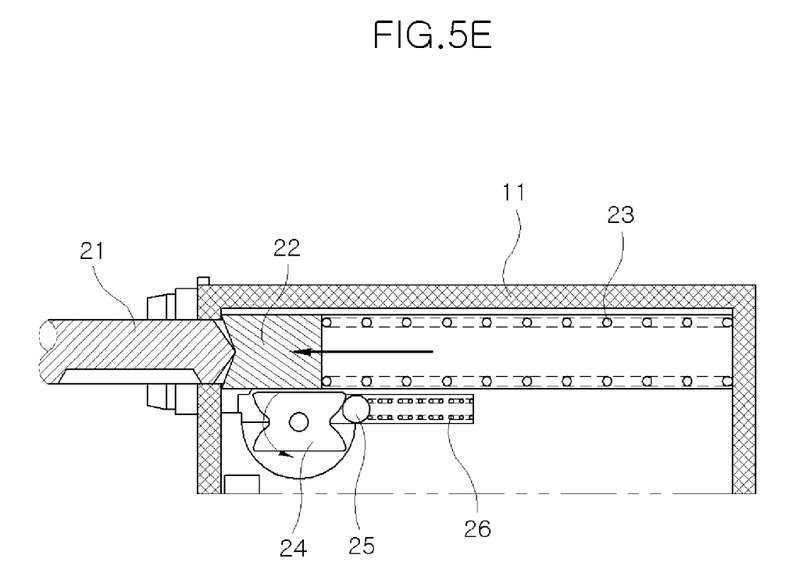
Figure 5F:
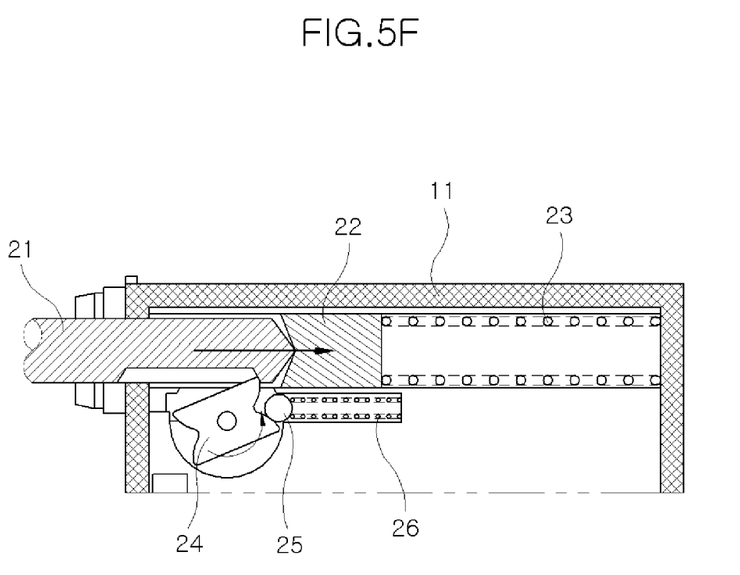

FIG. 5E illustrates a state in which the plunger spring 23 maximally pushes the plunger 22 and the door catch 21. Owing to a maximum releasing of the door catch 21 from the housing 11, the door catch 21 pops the fuel door D up. In this case, the cam 24 continues to be rotated in the counterclockwise direction together with the movement of the door catch 21.

When the fuel door D is popped up, the user opens the fuel door D and refuels.

When the refueling is completed, the user closes the fuel door D. When the fuel door D is closed, the fuel door D is in a pushed state again (see FIG. 5F). When the fuel door D is pushed and thus the door catch 21 is inserted, the cam 24 is rotated in a clockwise direction.

Thereafter, when the push for blocking the fuel door D is released, the door catch 21 is restored to the state of FIG. 5A together with the plunger 22 due to the plunger spring 23. When the door catch 21 is restored from the state of FIG. 5F to the state of FIG. 5A, the cam 24 is rotated in the counterclockwise direction by being caught to the end portion of the cam accommodation groove 21a, and the end portion of the door catch 21 and a front circumference of the plunger 22 are restrained to the control groove 24b such that the cam 24 is in the state of FIG. 5A again.

In a state of being restored to the state of FIG. 5A, when the door lock 43 is locked by the driver of the vehicle, the BCM 41 operates the drive motor 31 to insert the cam restraint portion 34a into the control groove 24b so that the fuel door D is in a locked state.

In accordance with a fuel door opener assembly for a push type fuel door having the above-described configuration according to embodiments of the present disclosure, it is possible to simplify a structure of the fuel door opener assembly for locking or unlocking a fuel door and popping the fuel door up.

Further, since the locking or unlocking is performed by interlocking with a door lock of the vehicle, it is possible to open the fuel door without a separate operation.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A fuel door opener assembly for a push type fuel door, the fuel door opener assembly comprising:
   a pop-up part installed inside a housing and configured to pop a fuel door up when the fuel door is pressed from the outside, the pop-up part including:
      a plunger installed to be slidable inside the housing in a state of being elastically supported;
      a door catch connected to the fuel door, installed to pass through the housing, disposed coaxially with the plunger, brought into contact with an end portion of the plunger, and configured to pop up the fuel door;
      a cam configured to restrain sliding of the door catch; and
      a plunger spring configured to elastically support the plunger toward the door catch inside the housing; and
   a locking part installed inside the housing and configured to release a restraint of the pop-up part to be able to pop up the fuel door or to restrain the pop-up part to not be able to pop up the fuel door, the cam being selectively restrained by the locking part and configured to restrain sliding of the door catch when restrained by the locking part.

2. The fuel door opener assembly of claim 1, wherein a portion in which the door catch is brought into contact with the plunger includes an inclined portion formed to conically protrude to one of the door catch and the plunger, and a concave portion formed in the other one of the door catch and the plunger and configured to accommodate the inclined portion.

3. The fuel door opener assembly of claim 2, wherein an angle between a central axis of the door catch and an inclined surface of the inclined portion is formed to be smaller than an angle between the central axis of the door catch and an inclined surface of the concave portion of the plunger.

4. The fuel door opener assembly of claim 1, wherein a cam accommodation groove is formed on an outer side of the door catch and is configured to accommodate a portion of the cam in a length direction of the door catch.

5. The fuel door opener assembly of claim 1, wherein the cam includes:
   a horizontal surface in which a portion of a circumference of the cam is incised; and
   a control groove formed to be concave in a V shape toward a center of the cam and configured to restrain an end portion of the door catch according to a rotational angle of the cam, the horizontal surface and the control groove being alternately formed.

6. The fuel door opener assembly of claim 5, wherein the door catch is restrained when the end portion of the door catch is caught to the control groove in a state in which a rotation of the cam is restrained.

7. The fuel door opener assembly of claim 5, further comprising:
   a ball slidably installed in the housing and configured to be brought into contact with an outer surface of the cam; and
   a ball spring configured to elastically support the ball toward the cam.

8. The fuel door opener assembly of claim 7, wherein a direction in which the ball slides is eccentric with respect to a rotating shaft of the cam.

9. The fuel door opener assembly of claim 1, wherein the locking part includes:
   a drive motor;
   a cam restraint gear configured to restrain or release the cam according to a rotation of the drive motor; and
   a power transmission member configured to transmit a driving force of the drive motor to the cam restraint gear such that the cam restraint gear restrains or releases the cam.

10. The fuel door opener assembly of claim 9, wherein the cam restraint gear includes a cam restraint portion formed in a rack gear shape and inserted into a control groove formed to be concave toward a center of the cam.

11. The fuel door opener assembly of claim 9, further comprising:
    a guide protrusion formed in the housing and configured to guide sliding of the cam restraint gear; and
    a guide groove formed in the cam restraint gear and configured to accommodate the guide protrusion.

12. The fuel door opener assembly of claim 1, further comprising:
    a control unit configured to be interlocked with a door lock of a vehicle and to control the locking part such that the pop-up part is in a locked state or an unlocked state.

13. A method of operating a fuel door opener assembly, the method comprising:
    engaging a plunger with a cam, the cam restraining a door catch;
    pushing a fuel door;
    inserting the door catch into a housing;
    pushing the plunger into the housing so that a plunger spring is maximally compressed;
    releasing the restraint between the door catch and the cam, wherein the cam is rotated in a counterclockwise direction due to an elastic force of a ball spring;
    releasing the pushing of the fuel door;
    pushing the plunger and the door catch with the plunger spring;
    sliding the door catch outside of the housing, wherein an end portion of a cam accommodation groove of the door catch rotates the cam in the counterclockwise direction;
    maximally pushing the plunger and the door catch with the plunger spring;
    releasing the door catch from the housing; and
    popping up the fuel door.

14. A door opener assembly comprising:
    a housing having a through-hole and a sliding groove;
    a door catch configured to be inserted into the through-hole and to slide in the sliding groove of the housing, an end portion of the door catch located on an outer side of the housing connected to a door;
    a plunger slidably installed inside the housing coaxially with the door catch;
    a plunger spring installed inside the housing and elastically supporting the plunger to maintain the door catch and the plunger in a contact state;
    a cam rotatably installed inside the housing, the cam including two control grooves evenly spaced around a circumference of the cam and separated by horizontal surfaces of the cam; and
    a locking part installed inside the housing.

15. The door opener assembly of claim 14, further comprising a cam accommodation groove formed on an outer surface of the door catch and configured to accommodate a portion of the cam.

16. The door opener assembly of claim 14, wherein a portion in which the door catch is brought into contact with the plunger includes an inclined portion formed to conically protrude to one of the door catch and the plunger, and a concave portion formed in a remaining one of the door catch and the plunger and configured to accommodate the inclined portion.

17. The door opener assembly of claim 14, wherein each of the control grooves is concave in a V shape toward a center of the cam.

18. The door opener assembly of claim 14, further comprising:
    a ball slidably installed in the housing and configured to be brought into contact with an outer surface of the cam; and
    a ball spring configured to elastically support the ball toward the cam.

19. The door opener assembly of claim 14, wherein the locking part includes:
    a drive motor;
    a cam restraint gear configured to restrain or release the cam according to a rotation of the drive motor; and
    a power transmission member configured to transmit a driving force of the drive motor to the cam restraint gear.

20. The door opener assembly of claim 19, wherein the cam restraint gear includes a cam restraint portion formed in a rack gear shape.

* * * * *